US011537987B2

(12) United States Patent
Joja et al.

(10) Patent No.: US 11,537,987 B2
(45) Date of Patent: Dec. 27, 2022

(54) PROCESSING APPARATUS, PROCESSING METHOD, AND NON-TRANSITORY STORAGE MEDIUM

(71) Applicant: NEC Corporation, Tokyo (JP)

(72) Inventors: Ichiro Joja, Tokyo (JP); Kazuto Ohishi, Tokyo (JP); Yuki Komiyama, Tokyo (JP); Satoshi Matsui, Tokyo (JP); Miho Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/005,837

(22) Filed: Aug. 28, 2020

(65) Prior Publication Data

US 2021/0097485 A1  Apr. 1, 2021

(30) Foreign Application Priority Data

Sep. 26, 2019 (JP) .............................. JP2019-175082

(51) Int. Cl.
 *G06Q 10/08* (2012.01)
 *G06Q 10/06* (2012.01)
(52) U.S. Cl.
 CPC ... *G06Q 10/0875* (2013.01); *G06Q 10/06312* (2013.01); *G06Q 10/06315* (2013.01)
(58) Field of Classification Search
 CPC .... G06Q 10/087; G06Q 10/08; G06Q 10/063; G06Q 30/00; G06Q 10/0833; G06Q 10/06315; G06Q 50/28; G06Q 10/0637; G06Q 10/083; G06Q 10/0635; G06Q 20/3674
See application file for complete search history.

(56) References Cited

U.S. PATENT DOCUMENTS

| | | | | |
|---|---|---|---|---|
| 6,947,905 B1* | 9/2005 | Starr | ...................... | G06Q 10/06 705/37 |
| 10,339,595 B2* | 7/2019 | Glaser | .................... | H04N 7/181 |
| 10,482,444 B2* | 11/2019 | Okamoto | ............. | G06Q 20/203 |
| 10,692,086 B2* | 6/2020 | Leong | .................. | G06Q 20/065 |
| 10,997,615 B1* | 5/2021 | Alvarez | .................. | G06F 3/048 |

(Continued)

FOREIGN PATENT DOCUMENTS

JP  2011-090595 A  5/2011

OTHER PUBLICATIONS

Gilvan C. Souza (2014). Supply chain analytics. Science Direct. (Year: 2014).*

(Continued)

*Primary Examiner* — Peter Ludwig
(74) *Attorney, Agent, or Firm* — Sughrue Mion, PLLC

(57) ABSTRACT

A processing apparatus according to the present invention includes a screen output unit that generates and outputs an inventory status screen on which an inventory status at each of a plurality of inventory checkpoints in a supply chain is displayed. On the inventory status screen, a plurality of objects respectively corresponding to the plurality of inventory checkpoints are displayed so that an appearance order of the inventory checkpoints in the supply chain can be identified. An image of a container having a size corresponding to an optimal inventory quantity or an optimal inventory value, and an image of a content having a size corresponding to a current inventory quantity or a current inventory value are displayed in the object.

13 Claims, 9 Drawing Sheets

(56) References Cited

U.S. PATENT DOCUMENTS

| | | | |
|---|---|---|---|
| 11,055,658 B2* | 7/2021 | Jacobson | G06Q 10/087 |
| 2003/0182260 A1* | 9/2003 | Pickett | G06Q 10/06 |
| 2006/0282277 A1* | 12/2006 | Ng | G06Q 10/0831 |
| | | | 705/333 |
| 2008/0312987 A1* | 12/2008 | Damodaran | G06F 16/29 |
| | | | 705/28 |
| 2014/0172494 A1* | 6/2014 | Hosoda | G06Q 10/087 |
| | | | 705/7.25 |
| 2015/0120373 A1* | 4/2015 | Bajaj | G06Q 10/06315 |
| | | | 705/7.25 |
| 2015/0170382 A1* | 6/2015 | Bhatia | G06Q 40/00 |
| | | | 345/440 |
| 2015/0254589 A1* | 9/2015 | Saxena | G06Q 10/087 |
| | | | 705/7.25 |
| 2016/0203441 A1* | 7/2016 | Craig | G06Q 10/103 |
| | | | 705/29 |
| 2016/0217399 A1* | 7/2016 | Roelofs | G06Q 10/08355 |
| 2017/0262862 A1* | 9/2017 | Aljawhari | G06F 16/242 |
| 2018/0096175 A1* | 4/2018 | Schmeling | G06Q 10/08 |
| 2018/0285810 A1* | 10/2018 | Ramachandran | G06F 16/27 |
| 2018/0285907 A1* | 10/2018 | Hoertz | G06Q 30/0205 |
| 2020/0097869 A1* | 3/2020 | Bajaj | G06N 20/00 |

OTHER PUBLICATIONS

Rahul Basole et al. (2016). Visualization of innovation in global supply chain networks. ResearchGate (Year: 2016).*

Sandeep Kumar Singh et al. (Feb. 2019). Multi-echelon supply network analysis with interactive visualization. (Year: 2019).*

Rick Goh et al. (2013). RiskVis: Supply chain visualization with risk management and real-time monitoring. IEEE. (Year: 2013).*

* cited by examiner

FIG. 3

| INVENTORY CHECKPOINT IDENTIFICATION INFORMATION | INVENTORY DETAILS | NECESSARY QUANTITY (PER DAY) | REFERENCE NUMBER OF DAYS | UNIT PRICE | OPTIMAL INVENTORY QUANTITY | OPTIMAL INVENTORY VALUE | ... |
|---|---|---|---|---|---|---|---|
| 00001 | ○○ FACTORY XX PROCESS △△ LINE ☐ INTERMEDIATE PRODUCT | 150 | 3 DAYS | 300 YEN /PIECE | 450 | 135,000 YEN | ... |
| 00002 | ○○ FACTORY XX PROCESS △△ LINE ○× INTERMEDIATE PRODUCT | 50 | 3 DAYS | 450 YEN /PIECE | 150 | 67,500 YEN | ... |
| ... | ... | ... | ... | ... | ... | ... | ... |

FIG. 4

INVENTORY CHECKPOINT IDENTIFICATION INFORMATION: 00001

| DATE | INVENTORY QUANTITY | INVENTORY VALUE | WAREHOUSING QUANTITY | USAGE QUANTITY/ DELIVERY QUANTITY | ... |
|---|---|---|---|---|---|
| 2019.9.3 | 462 | 138,600 YEN | 140 | 130 | ... |
| 2019.9.4 | 456 | 136,800 YEN | 140 | 146 | ... |
| ⋮ | ⋮ | ⋮ | ⋮ | ⋮ | ⋮ |

PROCESSING APPARATUS, PROCESSING METHOD, AND NON-TRANSITORY STORAGE MEDIUM

This application is based on Japanese patent application NO. 2019-175082, the content of which is incorporated hereinto by reference.

BACKGROUND

Technical Field

The present invention relates to a processing apparatus, a processing method, and a program.

Related Art

Japanese Patent Application Publication No. 2011-90595 discloses a production management system that manages inventory of parts used for producing products.

SUMMARY

By managing inventory of parts, products, or the like at each of a plurality of points in a supply chain, it is possible to recognize a point where a trouble (excess stock, understock, or the like) occurs in the supply chain.

However, in a case where a managed inventory status is not properly displayed, a problem such as overlooking a trouble that occurs may occur. An object of the present invention is to provide a technique for appropriately displaying an inventory status at each of a plurality of points in a supply chain.

In one embodiment, there is a processing apparatus including: a screen output unit that generates and outputs an inventory status screen on which an inventory status at each of a plurality of points in a supply chain is displayed, in which on the inventory status screen, a plurality of objects respectively corresponding to the plurality of points are displayed so that an appearance order of the points in the supply chain can be identified, and in which an image of a container having a size corresponding to an optimal inventory quantity or an optimal inventory value, and an image of a contained object having a size corresponding to a current inventory quantity or a current inventory value are displayed in the object.

In another embodiment, there is provided a processing method executed by a computer, the method including: generating and outputting an inventory status screen on which an inventory status at each of a plurality of points in a supply chain is displayed; displaying, on the inventory status screen, a plurality of objects respectively corresponding to the plurality of points so that an appearance order of the points in the supply chain can be identified; and displaying an image of a container having a size corresponding to an optimal inventory quantity or an optimal inventory value, and an image of a contained object having a size corresponding to a current inventory quantity or a current inventory value in the object.

In still another embodiment, there is provided a program causing a computer to function as: a screen output unit that generates and outputs an inventory status screen on which an inventory status at each of a plurality of points in a supply chain is displayed, in which on the inventory status screen, a plurality of objects respectively corresponding to the plurality of points are displayed so that an appearance order of the points in the supply chain can be identified, and in which an image of a container having a size corresponding to an optimal inventory quantity or an optimal inventory value, and an image of a contained object having a size corresponding to a current inventory quantity or a current inventory value are displayed in the object.

According to the present invention, it is possible to display an inventory status at each of a plurality of points in a supply chain by an appropriate method.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 3 is a diagram schematically illustrating an example of information processed by the processing apparatus of the present example embodiment.

FIG. 4 is a diagram schematically illustrating an example of information processed by the processing apparatus of the present example embodiment.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

A processing apparatus of an example embodiment of the present invention has a function of generating and outputting an inventory status screen that displays an inventory status at each of a plurality of points in a supply chain by an appropriate method. The details will be described hereinafter.

Figure 1:
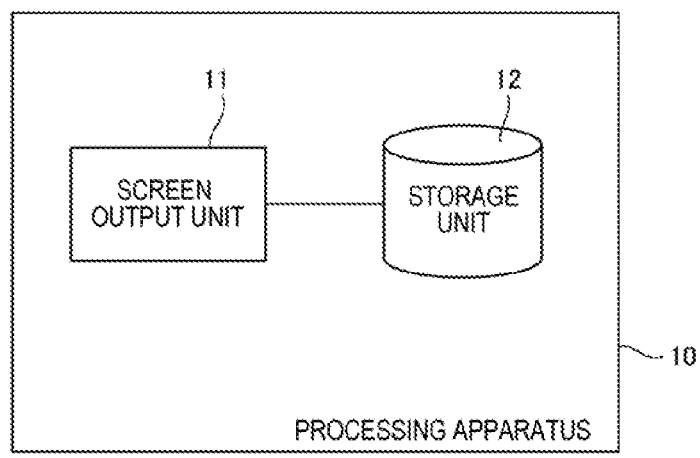
FIG. 1 is a functional block diagram illustrating an example of a processing apparatus according to the present example embodiment.

FIG. 1 is a functional block diagram illustrating an example of a processing apparatus 10. As shown in the figure, the processing apparatus 10 includes a screen output unit 11 and a storage unit 12. Note that, a configuration in which the processing apparatus 10 does not have the storage unit 12 may be used. In this case, an external device configured to be communicable with the processing apparatus 10 includes the storage unit 12.

Each functional unit included in the processing apparatus 10 is realized by any combination of hardware and software based on a central processing unit (CPU), a memory, a program loaded in the memory, a storage unit such as a hard disk that stores the program (such as a program stored at a stage of shipping the apparatus in advance, or a program downloaded from a storage medium such as a compact disc (CD) or a server on the Internet), and a network connection interface, in a certain computer. Further, it will be understood by those skilled in the art that there are various modification examples in a method and apparatus for realizing such a configuration.

Figure 2:
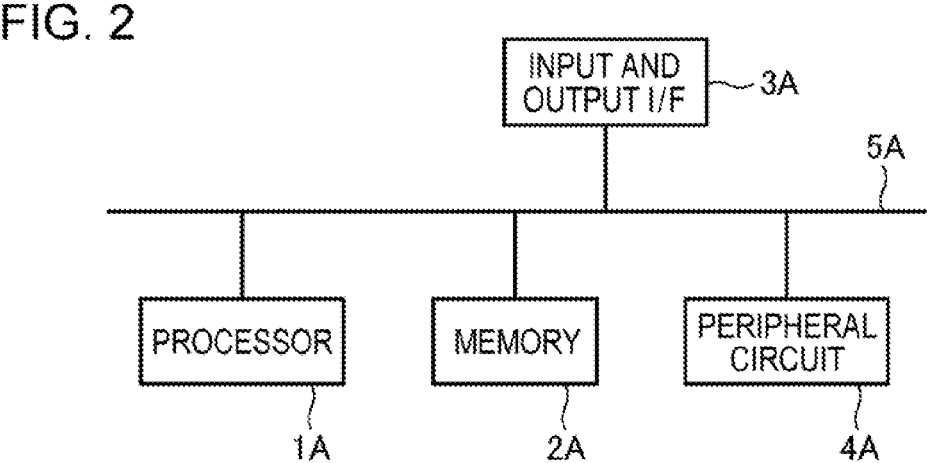
FIG. 2 is a diagram illustrating an example of a hardware configuration of the processing apparatus of the present example embodiment.

FIG. 2 is a block diagram illustrating an example of a hardware configuration of the processing apparatus 10. As shown in FIG. 2, the processing apparatus 10 includes a processor 1A, a memory 2A, an input and output interface 3A, a peripheral circuit 4A, and a bus 5A. The peripheral circuit 4A includes various modules. Note that, a configuration in which the peripheral circuit 4A is not provided may be used. The processing apparatus 10 may be configured by one apparatus that is physically and/or logically integrated, or may be configured by a plurality of apparatuses that are separated. In a case where the processing apparatus 10 is configured by the plurality of apparatuses that are physically and/or logically separated, each of the plurality of apparatuses may have the above-described hardware configuration.

The bus 5A is a data transmission path through which the processor 1A, the memory 2A, the peripheral circuit 4A, and the input and output interface 3A mutually transmit and receive data. The processor 1A is an arithmetic processing unit such as a CPU or a graphics processing unit (GPU), for example. The memory 2A is a memory such as a random access memory (RAM) or a read only memory (ROM), for example. The input and output interface 3A includes an interface for acquiring information from an input device, an external device, an external server, an external sensor, a camera, or the like, and an interface for outputting information to an output device, an external device, an external server, or the like, for example. The input device is, for example, a keyboard, a mouse, a microphone, a touch panel, a physical button, a camera, or the like. The output device is, for example, a display, a speaker, a printer, an emailer, or the like. The processor 1A may output a command to each module, and may perform calculation on the basis of calculation results of the modules.

Returning to FIG. 1, the storage unit 12 stores various kinds of information about each of a plurality of points (hereinafter, referred to as "inventory checkpoints") included in at least a part of a supply chain including raw material procurement, production management, distribution, sales, and the like. Which point in the supply chain is to be the inventory checkpoint is a design matter, and accordingly, a user may discretionally decide the point in accordance with actual situations, content to be managed, or the like.

For example, in a case where purchased A materials are delivered to an A warehouse and are stored in the A warehouse, an inventory status of the A materials in the A warehouse may be set as one inventory checkpoint.

In addition, in a case where some of the A materials stored in the A warehouse are subsequently moved to an A factory and are stored in the A factory for the purpose of usage at an A line in an A process, an inventory status of the A materials in the A factory may be set as one inventory checkpoint.

Further, in a case where other some of the A materials stored in the A warehouse are subsequently moved to a B factory and are stored in the B factory for the purpose of usage at a B line in a B process, an inventory status of the A materials in the B factory may be set as one inventory checkpoint.

In addition, in a case where some of completed A products are delivered to the B warehouse and are stored in the B warehouse, an inventory state of the A products in the B warehouse may be set as one inventory checkpoint.

Further, in a case where some of the A products stored in the B warehouse are moved to an A store and are stored at the A store, an inventory status of the A products at the A store may be set as one inventory checkpoint.

Further, in a case where other some of the A products stored in the B warehouse are moved to a B store and are stored at the B store, an inventory status of the A products at the B store may be set as one inventory checkpoint.

Here, the inventory checkpoints are merely examples, and the present invention is not limited to thereto.

FIG. 3 shows an example of information stored in the storage unit 12. In the illustrated example, inventory checkpoint identification information, inventory details, a necessary quantity, a reference number of days, a unit price, an optimal inventory quantity, and an optimal inventory value are linked to each other. The illustrated example is merely an example, and some items in the illustrated example may not be included, and information on other items may be included.

The "inventory checkpoint identification information" is information that identifies a plurality of inventory checkpoints from each other. For example, the plurality of inventory checkpoints are identified from each other by serial numbers, for example.

The "inventory details" include a name of an inventory product, a place where the inventory product is stored, a usage purpose, and the like.

The "necessary quantity" is the quantity of usage, shipping, or the like of inventory products managed at each inventory checkpoint within a predetermined period. In the present example embodiment, the predetermined period is "one day", but the present invention is not limited to thereto. Further, in the illustrated example, the unit of quantity is "piece", but the unit is not limited thereto, and may be a different unit such as a weight, a length, or a volume. The necessary quantity is set and registered by a user.

The "reference number of days" is set and registered by the user. The product of the necessary quantity and the reference number of days is the optimal inventory quantity.

The "unit price" is a unit price of an inventory product.

The "optimal inventory quantity" is the product of the necessary quantity and the reference number of days.

The "optimal inventory value" is the product of the unit price and the optimal inventory quantity.

Further, the storage unit 12 may store inventory information indicating an inventory status at each of the plurality of inventory checkpoints. FIG. 4 schematically illustrates an example of inventory information stored in the storage unit 12. The illustrated information is inventory information at an inventory checkpoint identified by inventory checkpoint identification information "00001". In the illustrated example, a date, an inventory quantity on each day, an inventory value, which is the product of the inventory quantity and a unit price, a warehousing quantity on each day, and a usage quantity/a delivery quantity on each day are linked to each other. The illustrated example is merely an example, and some items in the illustrated example may not be included, and information on other items may be included.

Returning to FIG. 1, the screen output unit 11 generates and outputs an inventory status screen showing an inventory status at each of the plurality of inventory checkpoints in the supply chain. The screen output unit 11 may output the inventory status screen through any output device such as a display, a projection device, an emailer, or a printer. Hereinafter, an example of the inventory status screen generated by the screen output unit 11 will be described.

First inventory status screen

Figure 5:
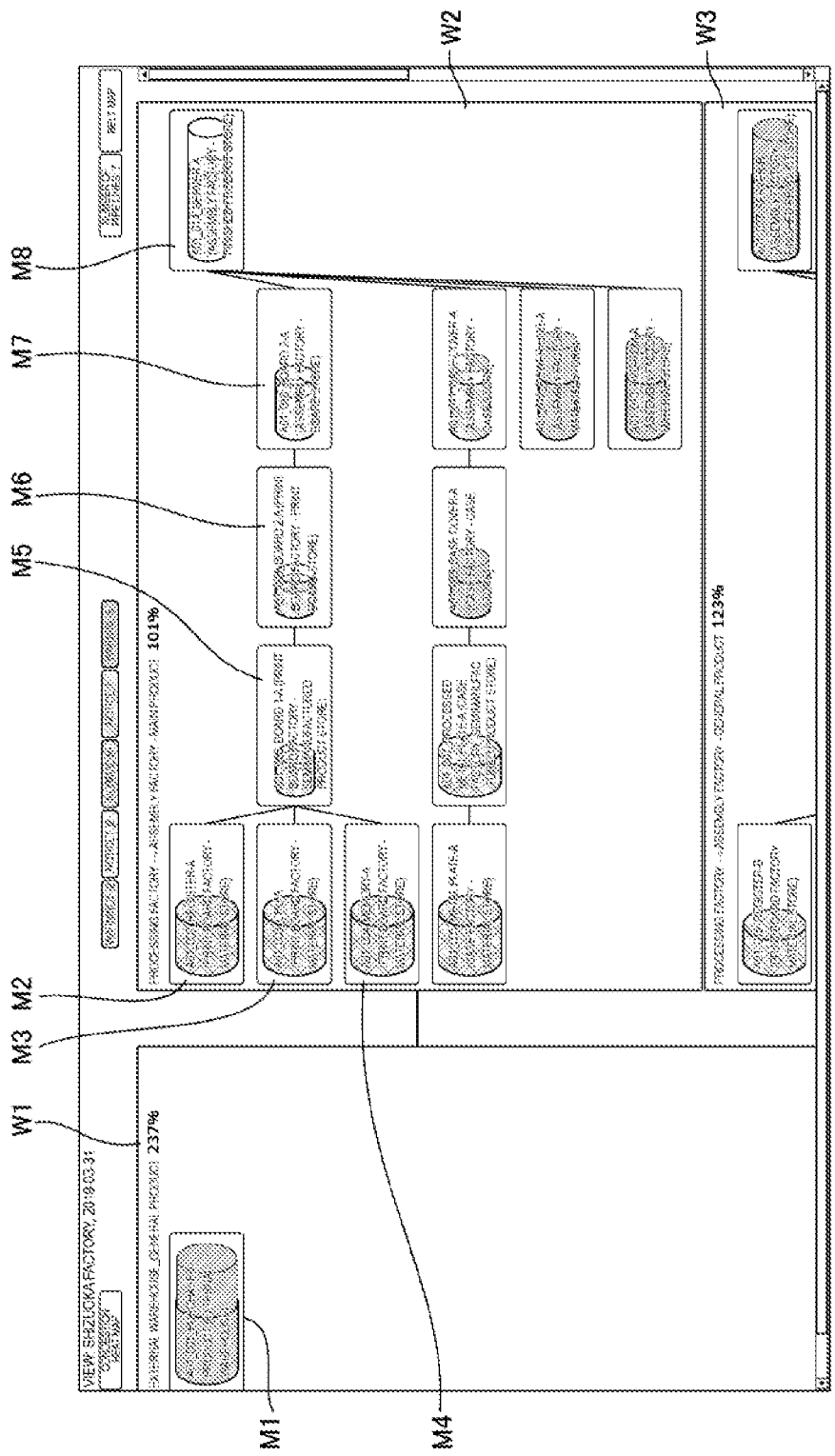
FIG. 5 is a diagram illustrating an example of an inventory status screen generated by the processing apparatus of the present example embodiment.

FIG. 5 illustrates an example of a first inventory status screen.

<Frame of First Inventory Status Screen>

In the illustrated inventory status screen, frames W1 to W3 respectively corresponding to a plurality of groups are shown. In the illustrated example, the number of frames is three, but the present invention is not limited thereto. Each group relates to a part of the supply chain. In the case of the illustrated example, the frame W1 relates to an external warehouse for storing general products, the frame W2 relates to a processing factory and an assembly factory for managing main products, and the frame W3 relates to a processing factory and an assembly factory for managing general products.

On the inventory status screen, the plurality of frames W1 to W3 may be displayed so that the order of appearance of each group in the supply chain can be identified. In the illustrated example, the plurality of frames W1 to W3 are displayed in the order of appearance from the left. Further, the appearance order can be identified by connecting a plurality of frames with a line.

In the illustrated example, the frame W1 is located on a left side of the frame W2, and these frames W1 and W2 are connected to each other by a line. This means that at least a part of a "general product managed in the external warehouse (frame W1)" is "delivered to the processing factory and the assembly factory and managed as a main product (frame W2)".

The frame W1 is located on a left side of the frame W3. Further, although not shown, in a case where the inventory status screen is scrolled, a line connecting the frame W1 and the frame W3 is displayed. This means that at least a part of the "general product managed in the external warehouse (frame W1)" is "delivered to the processing factory and the assembly factory and managed as a general product (frame W3)".

The frames W1 to W3 may be displayed in such a manner that a ratio of a current inventory quantity or a current inventory value to an optimal inventory quantity or an optimal inventory value at the entirety of a plurality of inventory checkpoints that belong to each group can be identified. For example, the frames W1 to W3 may be displayed with colors according to the ratios, or may be displayed in line types (solid line, dotted line, broken line, one-dot chain line, or the like) according to the ratios, may be displayed with lines having thicknesses according to the ratios, or may be displayed with shapes (square, circle, or the like) according to the ratios.

For example, the ratio may be divided into five stages, that is, "a case where the ratio is too small (equal to or less than P1)", "a case where the ratio is slightly small (larger than P1 and equal to or less than P2)", "a case where the ratio is optimal (larger than P2 and equal to or less than P3)", "a case where the ratio is slightly large (larger than P3 and equal to or less than P4)", and "a case where the ratio is too large (larger than P4)", and the color of the line or the like may be divided according to each case.

<Object of First Inventory Status Screen>

One or a plurality of objects are displayed in each of the frames W1 to W3. In the illustrated example, the object has an approximately rectangular shape, but the shape of the object is not limited thereto. A variety of information is displayed in the object.

Focusing on the frame W2, 13 objects (7 objects marked with M2 to M8 and 6 objects not marked) are displayed. The 13 objects respectively correspond to a plurality of inventory checkpoints included in the group of the frame W2.

The 13 objects may be displayed so that the order of appearance of each inventory checkpoint in the supply chain can be identified. In the illustrated example, 13 objects are displayed in the order of appearance from the left. In addition, the appearance order may be identified by connecting a plurality of objects with a line.

According to the illustrated example, it can be seen that an inventory product managed by an inventory checkpoint corresponding to the object M5 is manufactured from three inventory products managed by three inventory checkpoints respectively corresponding to the objects M2 to M4, an inventory product managed by an inventory checkpoint corresponding to the object M6 is manufactured therefrom, an inventory product managed by an inventory checkpoint corresponding to the object M7 is manufactured therefrom, and an inventory product managed by an inventory checkpoint corresponding to the object M8 is manufactured on the basis of the object M7 and other inventory products.

In the object in the frame W2, an image of a container having a size corresponding to the optimal inventory quantity or the optimal inventory value at each inventory checkpoint and an image of a contained object having a size corresponding to a current inventory quantity or a current inventory value at each inventory checkpoint are displayed. The contained object may be contained in a container as shown in the figure, or may be displayed side by side.

Figure 6:
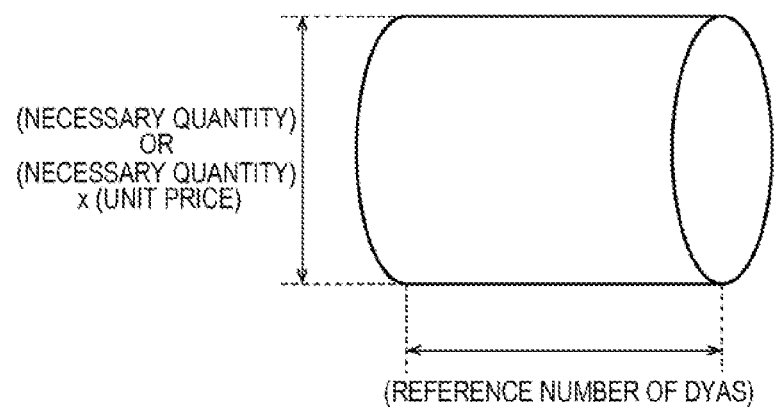
FIG. 6 is a diagram for illustrating information displayed on the inventory status screen according to the present example embodiment.

An example of a drawn container will be described with reference to FIG. 6. For example, the container is configured so that a bottom diameter has a value corresponding to the "necessary quantity" or the "product of the necessary quantity and the unit price" shown in FIG. 3 and the height of the container has a value corresponding to the "reference number of days" shown in FIG. 3. In this way, a container having a size corresponding to the optimal inventory quantity or the optimal inventory value is drawn.

Similarly, although not shown, a bottom diameter of the contained object may be a value corresponding to the "necessary quantity" or the "product of the necessary quantity and the unit price" shown in FIG. 3. Then, the height of the contained object may be a value corresponding to a value obtained by dividing the current "inventory quantity" or "inventory value" shown in FIG. 4 by the "necessary quantity" or "product of the necessary quantity and the unit price".

At least one of the object, the image of the container, or the image of the contained object is displayed so that the ratio of the current inventory quantity or the current inventory value to the optimal inventory quantity or the optimal inventory value can be identified. For example, at least one of the object, the image of the container, or the image of the contained object may be displayed with a color according to the ratio. In the illustrated example, the ratio is divided into five stages of "a case where the ratio is too small (equal to or less than P1)", "a case where the ratio is slightly small (larger than P1 and equal to or less than P2)", "a case where the ratio is optimal (larger than P2 and equal to or less than P3", "a case where the ratio is slightly large (larger than P3 and equal to or less than P4)", and "a case where the ratio is too large (larger than P4)", and the image of the contained object is displayed with a color according to the ratio.

The identification by colors is merely an example, and other display forms (such as shapes, lines, or the like) other than colors may be used according to the ratios.

In the illustrated example, the object in the frame W2 is displayed with a text indicating details at each of the plurality of inventory checkpoints. For example, a name of an inventory product, a name of a place where the inventory product is stored, and the like are displayed.

Next, focusing on the frame W1, one object M1 is displayed. The group of the frame W1 includes a plurality of inventory checkpoints. The plurality of inventory checkpoints respectively correspond to a plurality of general products stored in an external warehouse, for example.

The screen output unit 11 may display one object corresponding to the plurality of inventory checkpoints, instead of the plurality of objects corresponding to the plurality of inventory checkpoints as in the example of the object in the frame W1. In one object M1 corresponding to the plurality of inventory checkpoints, an image of a container having a size corresponding to the optimal inventory quantity or the optimal inventory value amount at the entirety of the plurality of inventory checkpoints and an image of a contained object having a size corresponding to the current inventory quantity or the current inventory value at the entirety of the plurality of inventory checkpoints are displayed.

Note that, in the object M1, similarly, the contained object may be stored in the container. Further, at least one of the object M1, the image of the container, or the image of the contained object may be displayed so that the ratio of the current inventory quantity or the current inventory value to the optimal inventory quantity or the optimal inventory value can be identified. Since its realization method is the same as in the case of the object in the frame W2, description thereof will not be repeated. Further, a text indicating details at the plurality of inventory checkpoints may be displayed in the object M1. In the illustrated example, information collectively indicating the plurality of inventory checkpoints is displayed in the text.

A user may generate each group, and may register the generated group in the processing apparatus 10. In addition, the user may determine "inventory checkpoints that belong to each group", "a method of arranging frames corresponding to each group on the inventory status screen", "a method of connecting a plurality of frames with lines", "a method of arranging each object on the inventory status screen", "a method of connecting a plurality of objects with lines", or the like, and may register the result in the processing apparatus 10. The screen output unit 11 may generate the above-described characteristic inventory status screen on the basis of the registered content.

Second Inventory Status Screen

Figure 7:
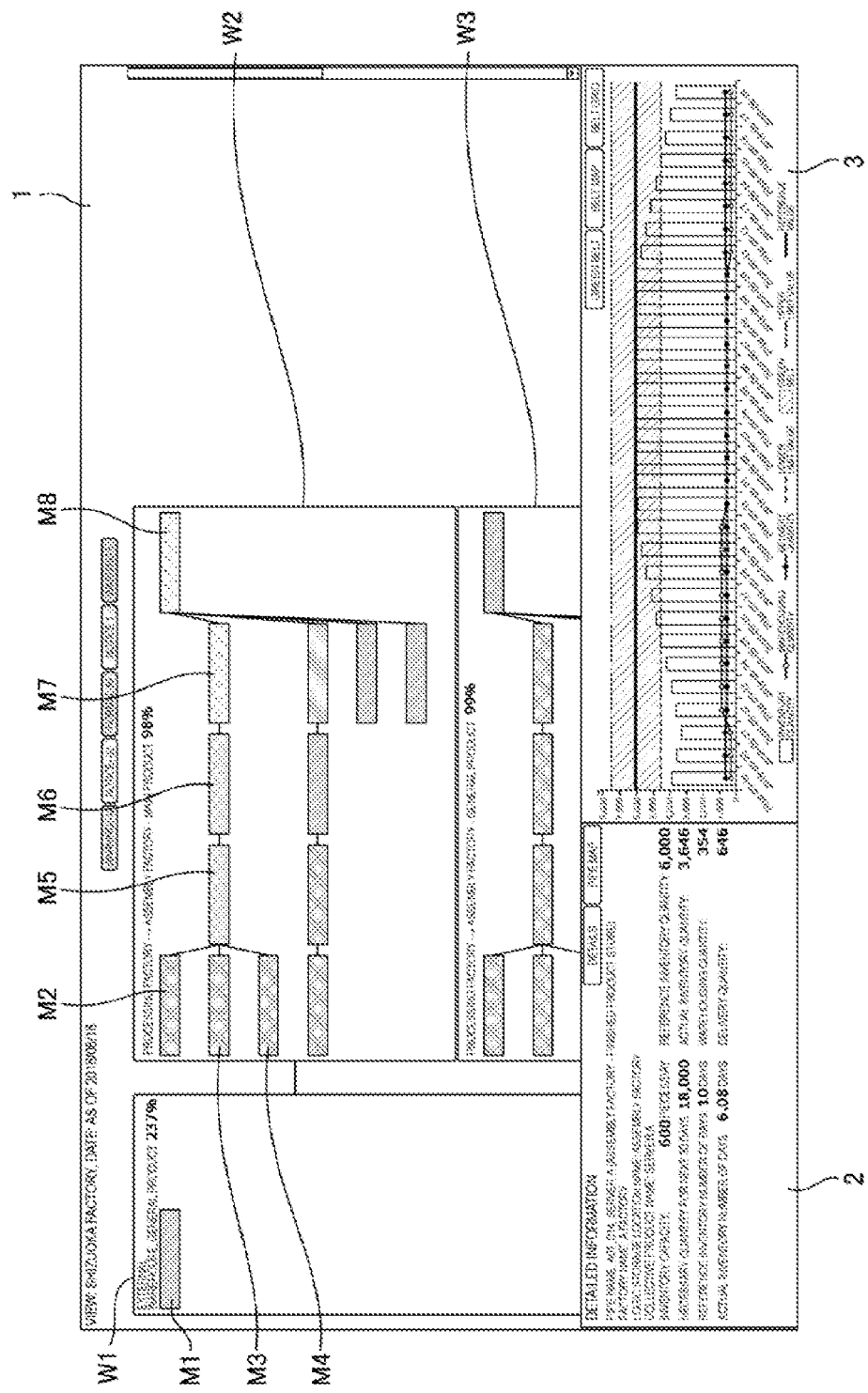
FIG. 7 is a diagram illustrating an example of an inventory status screen generated by the processing apparatus of the present example embodiment.

FIG. 7 illustrates an example of a second inventory status screen. The second inventory status screen has three display areas 1 to 3. In the display area 1, frames and objects are displayed by the same method as in the above-described first inventory status screen. Further, the second inventory status screen is different from the first inventory status screen in that information such as "an image of a container", "an image of a contained object", and "a text" is not displayed in the object. An object is displayed (for example, colored) so that the ratio of the current inventory quantity or the current inventory value to the optimal inventory quantity or the optimal inventory value at each inventory checkpoint can be identified.

In the display areas 2 and 3, information on inventory checkpoints corresponding to one object specified by the user in the display area 1 is displayed. In the display area 2, detailed information on a specified inventory checkpoint, for example, the information shown in FIGS. 3 and 4 is displayed. In the display area 3, a graph showing a temporal change of an inventory status at the specified inventory checkpoint is displayed. The graph shows a temporal change of an inventory quantity, a temporal change of a warehousing quantity, a temporal change of a delivery quantity, or the like. Further, in the graph, an upper limit value and a lower limit value of the optimal inventory quantity may be shown. Further, in the graph, an area between the upper limit value and the lower limit value of the optimal inventory quantity may be displayed so as to be distinguishable from other areas.

Third Inventory Status Screen

Figure 8:
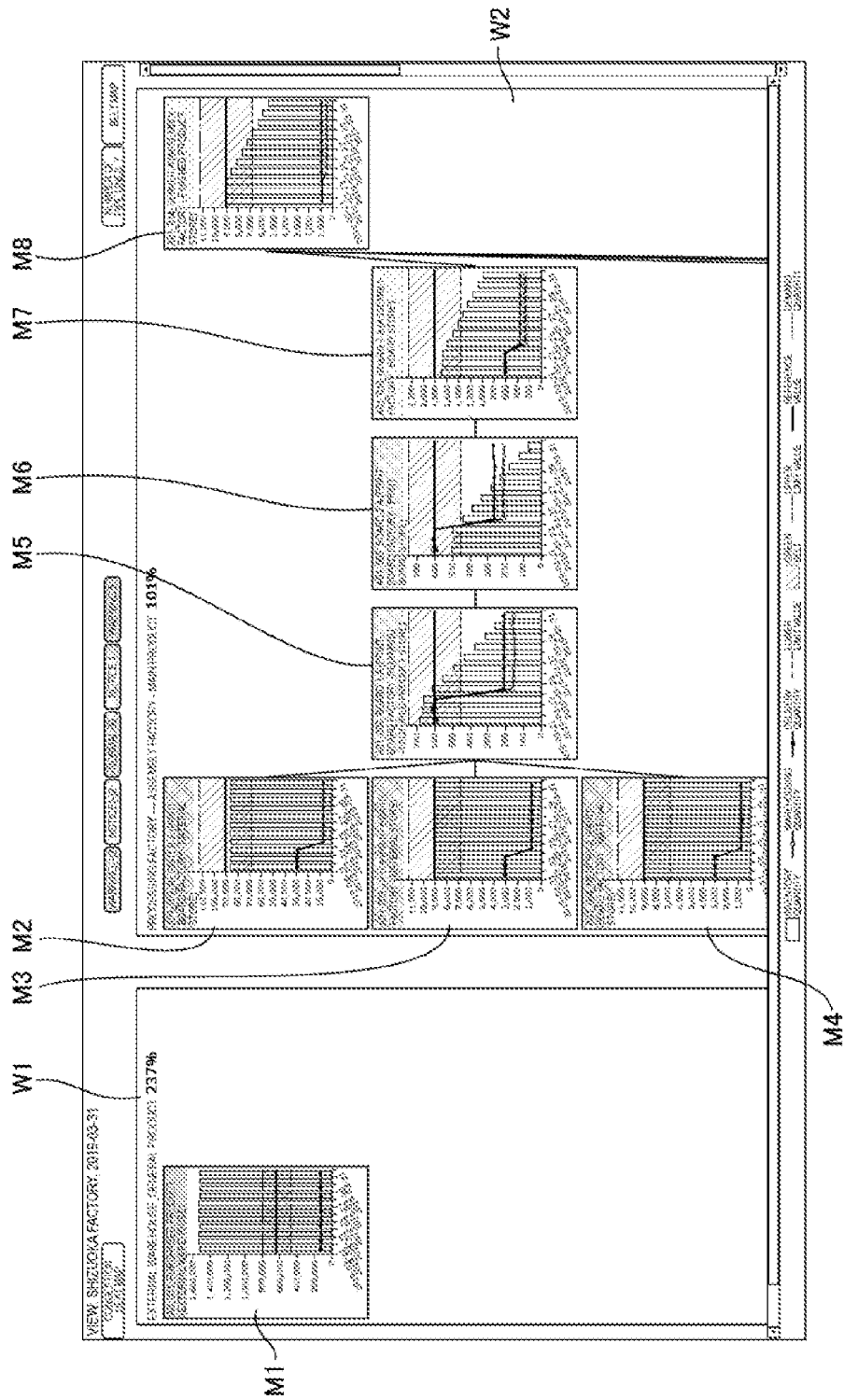
FIG. 8 is a diagram illustrating an example of an inventory status screen generated by the processing apparatus of the present example embodiment.

FIG. 8 illustrates an example of a third inventory status screen. The third inventory status screen displays frames and objects by the same method as in the first inventory status screen. Further, on the third inventory status screen, information displayed on an object is different from that on the first inventory status screen.

On the third inventory status screen, the graph displayed in the display area 3 of the second inventory status screen is displayed in the object. Note that, in a case where the display area of each object is sufficiently large, the images of the container and the contained object described above or the text may be displayed, in addition to the graph.

Fourth Inventory Status Screen

Figure 9:
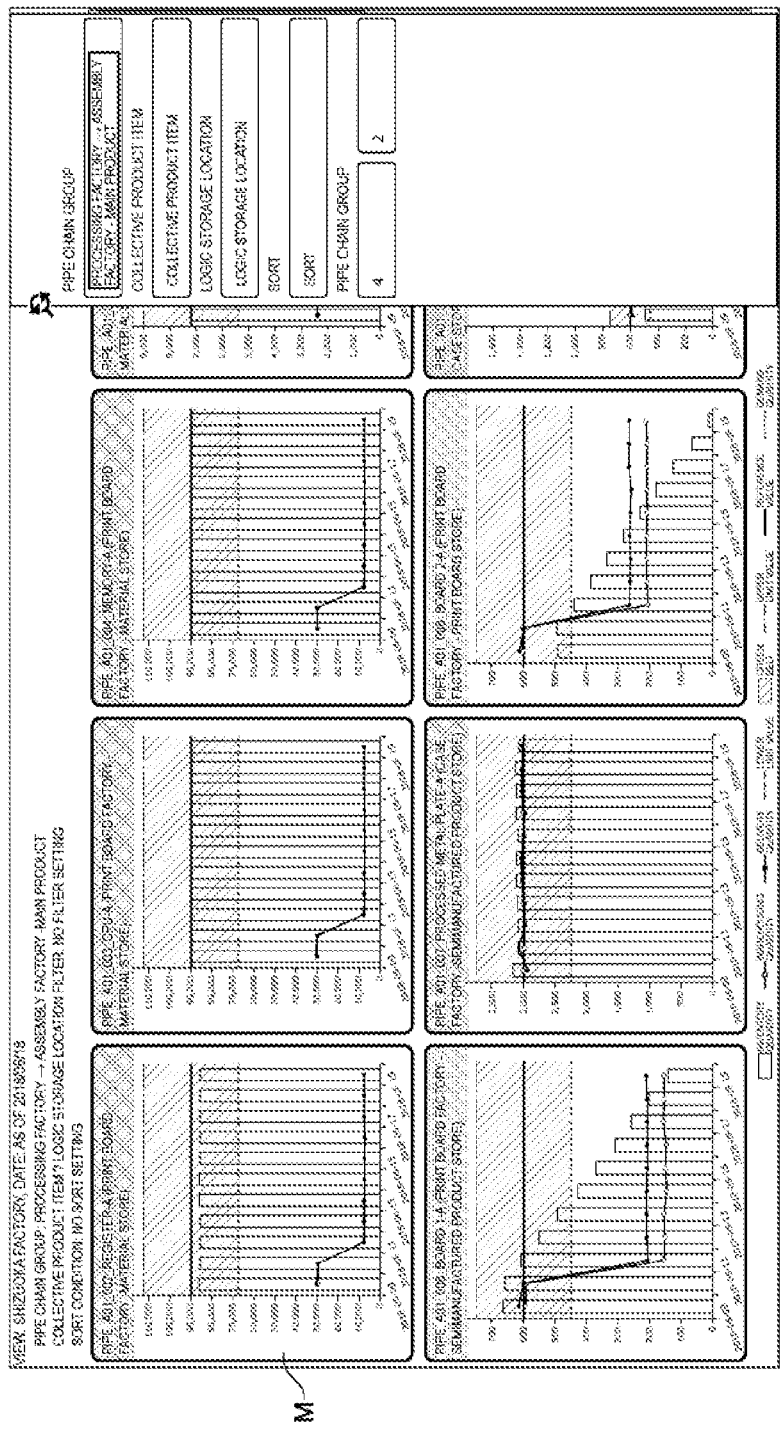
FIG. 9 is a diagram illustrating an example of an inventory status screen generated by the processing apparatus of the present example embodiment.

FIG. 9 shows an example of a fourth inventory status screen. The fourth inventory status screen displays a list of objects corresponding to respective inventory checkpoints that match search conditions specified by a user. Note that, the fourth inventory status screen may display a list of objects corresponding to respective inventory checkpoints pre-selected by the user. At least one of the graph, the images of the container and the contained object, or the text described above is displayed in the object.

As described above, according to the processing apparatus 10 of the present example embodiment, it is possible to display an inventory status at each of a plurality of inventory checkpoints in a supply chain by an appropriate method.

For example, it is possible to display an object that corresponds to each inventory checkpoint and indicates an inventory status at each inventory checkpoint in a manner that the appearance order of each inventory checkpoint in the supply chain can be identified. In this case, it is possible to check the inventory status at each of the plurality of inventory checkpoints, and to check the position of each inventory checkpoint in the supply chain. As a result, it is possible to recognize at which position in the supply chain a trouble such as excess stock or understock occurs.

In addition, in the case of the present example embodiment, it is possible to indicate an inventory status by an image of a container having a size corresponding to an optimal inventory quantity or an optimal inventory value and an image of a contained object having a size corresponding to a current inventory quantity or a current inventory value. In this case, it is possible to intuitively recognize a ratio of the current inventory quantity or the current inventory value to the optimal inventory quantity or the optimal inventory value.

Further, in the case of the present example embodiment, it is possible to change a display form of at least one of an object, an image of a container, or an image of a contained object according to the above-mentioned ratio. In this case, it is possible to easily recognize a trouble such as excess stock and understock on the basis of the display form of at least one of the object, the image of the container, or the image of the contained object.

Further, in the case of the present example embodiment, for example, it is possible to perform grouping in an unspecified unit such as a warehouse unit, a factory unit, a manufacturing line unit, a manufacturing process unit, or a store unit, and to display objects respectively corresponding to a plurality of inventory checkpoints for each group. Thus, even in a case where a large number of objects are displayed on a screen, it is possible to check an object separately for each group, to thereby recognize an inventory status thereof.

In addition, the plurality of groups are displayed so that an appearance order in the supply chain can be identified. Thus, it is possible to recognize at which position in the supply chain a trouble such as excess stock or understock occurs.

Further, in the case of the present example embodiment, as shown in FIG. 8, it is possible to display a graph showing a temporal change of an inventory quantity, a temporal change of a warehousing quantity, a temporal change of a delivery quantity, or the like for each of a plurality of objects. Further, in the graph, an upper limit value and a lower limit value of an optimal inventory quantity are shown, or a region sandwiched by the upper limit value and the lower limit value is displayed so as to be distinguishable from other regions. Thus, it is possible to easily recognize a time-series change at each inventory checkpoint, whether an inventory quantity at each timing is in an optimal status, and the like.

Further, in the case of the present example embodiment, as shown in FIG. 9, it is possible to display a list of objects corresponding to inventory checkpoints searched by a user or inventory checkpoints selected by the user. Thus, it is possible for the user to efficiently check an inventory status at an inventory checkpoint that the user wants to check.

Some or all of the above example embodiments may be disclosed as in the following supplementary notes, but are not limited thereto.

1. A processing apparatus including: a screen output unit that generates and outputs an inventory status screen on which an inventory status at each of a plurality of points in a supply chain is displayed, in which on the inventory status screen, a plurality of objects respectively corresponding to the plurality of points are displayed so that an appearance order of the points in the supply chain can be identified, and in which an image of a container having a size corresponding to an optimal inventory quantity or an optimal inventory value, and an image of a contained object having a size corresponding to a current inventory quantity or a current inventory value are displayed in the object.

2. The processing apparatus according to 1,
in which the contained object is stored in the container on the inventory status screen.

3. The processing apparatus according to 1 or 2,
in which the screen output unit generates the inventory status screen on which at least one of the object, the image of the container, or the image of the contained object is displayed so that a ratio of the current inventory quantity or the current inventory value to the optimal inventory quantity or the optimal inventory value can be identified.

4. The processing apparatus according to 3,
in which the screen output unit generates the inventory status screen on which at least one of the object, the image of the container, or the image of the contained object is displayed with a color according to the ratio of the current inventory quantity or the current inventory value to the optimal inventory quantity or the optimal inventory value.

5. The processing apparatus according to any one of 1 to 4,
in which the screen output unit generates the inventory status screen on which one object corresponding to the plurality of points is displayed, instead of the plurality of objects respectively corresponding to the plurality of points, and in which an image of the container having the size corresponding to the optimal inventory quantity or the optimal inventory value at the entirety of the plurality of points, and an image of the contained object having the size corresponding to the current inventory quantity or the current inventory value at the entirety of the plurality of points are displayed in the one object corresponding to the plurality of points.

6. The processing apparatus according to any one of 1 to 5,
in which a graph showing a temporal change of the current inventory quantity or the current inventory value at the point is displayed in the object.

7. The processing apparatus according to any one of 1 to 6,
in which a text showing details of the point is displayed in the object.

8. The processing apparatus according to any one of 1 to 7,
in which the screen output unit generates the inventory status screen on which the plurality of objects are displayed so that an appearance order of the points in the supply chain can be identified.

9. The processing apparatus according to any one of 1 to 8,
in which the screen output unit generates the inventory status screen on which a plurality of frames respectively corresponding to a plurality of groups are displayed and the objects corresponding to the points that belong to the respective groups are displayed in the plurality of frames.

10. The processing apparatus according to 9,
in which the screen output unit generates the inventory status screen on which the plurality of frames are displayed so that an appearance order of the groups in the supply chain can be identified.

11. The processing apparatus according to 9 or 10,
in which the screen output unit generates the inventory status screen on which the plurality of frames are displayed so that a ratio of the current inventory quantity or the current inventory value to the optimal inventory quantity or the optimal inventory value at the entirety of the points that belong to the respective groups can be identified.

12. A processing method executed by a computer, the method including:
generating and outputting an inventory status screen on which an inventory status at each of a plurality of points in a supply chain is displayed;

displaying, on the inventory status screen, a plurality of objects respectively corresponding to the plurality of points so that an appearance order of the points in the supply chain can be identified; and displaying an image of a container having a size corresponding to an optimal inventory quantity or an optimal inventory value, and an image of a contained object having a size corresponding to a current inventory quantity or a current inventory value in the object.

13. A program causing a computer to function as:
a screen output unit that generates and outputs an inventory status screen on which an inventory status at each of a plurality of points in a supply chain is displayed, in which on the inventory status screen, a plurality of objects respectively corresponding to the plurality of points are displayed so that an appearance order of the points in the supply chain can be identified, and in which an image of a container having a size corresponding to an optimal inventory quantity or an optimal inventory value, and an image of a contained object having a size corresponding to a current inventory quantity or a current inventory value are displayed in the object.

Although the present invention has been described with reference to the example embodiments (and examples), the present invention is not limited to the example embodiments (and examples). Various modifications that can be understood by those skilled in the art can be made to the configuration and details of the present invention within the scope of the present invention.

It is apparent that the present invention is not limited to the above embodiment, and may be modified and changed without departing from the scope and spirit of the invention.

What is claimed is:

1. A processing apparatus comprising:
   at least one memory configured to store one or more instructions; and
   at least one processor configured to execute the one or more instructions to:
   obtain, by communication over a network, inventory information and optimal inventory information at a plurality of points in a supply chain, the inventory information comprising any of current inventory quantities and current inventory values, and the optimal inventory information comprising any of an optimal inventory quantities and optimal inventory values;
   identify ratios between the inventory information and the optimal inventory information, the ratios indicating at least quantity differences between ones of the current inventory quantities and the optimal inventory quantities and value differences between ones of the current inventory values and the optimal inventory values;
   generate graphical containers based on the ratios such that sizes of contained objects in the one or more graphical containers are adjusted based on sizes of any of the quantity differences and value differences; and
   generate and output, on a user interface, an inventory status screen on which an inventory status at each of the points in the supply chain is displayed and also at least one of the contained objects of at least one of the graphical containers is displayed, on the inventory status screen, at a size, of the sizes, adjusted based on at least one of the ratios, the size visually illustrating at least one of any of the quantity differences and the value differences,
   wherein on the inventory status screen, the graphical containers respectively correspond to ones of the plurality of points in a manner representing an appearance order of the points in the supply chain.

2. The processing apparatus according to claim 1, wherein the at least one contained object is stored in the at least one graphical container on the inventory status screen.

3. The processing apparatus according to claim 1, wherein the processor is further configured to execute the one or more instructions to generate the inventory status screen such that each of the contained objects of each of the graphical containers is displayed, on the inventory status screen, at respective ones of the sizes each adjusted based on respective ones of the ratios, the sizes visually illustrating, by the contained objects, respective ones of any of the quantity differences and the value differences.

4. The processing apparatus according to claim 3, wherein the processor is further configured to execute the one or more instructions to generate the inventory status screen such that each of the contained objects of each of the graphical containers is displayed, on the inventory status screen, at respective ones of the sizes each adjusted based on respective ones of the ratios, the sizes visually illustrating, by the contained objects, respective ones of any of the quantity differences and the value differences.

5. The processing apparatus according to claim 1, wherein the processor is further configured to execute the one or more instructions to generate a second inventory status screen in which at least one of the graphical containers at least one of the points is replaced with a second graphical container illustrating a ratio between an optimal inventory quantity or an optimal inventory value among each of the points and a current inventory quantity or a current inventory value among each of the points.

6. The processing apparatus according to claim 1, wherein inventory status screen further comprises a graph showing a temporal change of the at least one ratio.

7. The processing apparatus according to claim 1, wherein a text showing details of the point is displayed in the at least one of the contained objects.

8. The processing apparatus according to claim 1, wherein the processor is further configured to execute the one or more instructions to generate the inventory status screen such that the inventory status screen illustrates the manner representing the appearance order of the points in the supply chain.

9. The processing apparatus according to claim 1, wherein the processor is further configured to execute the one or more instructions to generate the inventory status screen on which a plurality of frames respectively corresponding to a plurality of groups are displayed and the contained objects corresponding to the points that belong to the respective groups are displayed in respective ones of the plurality of frames.

10. The processing apparatus according to claim 9, wherein the processor is further configured to execute the one or more instructions to generate the inventory status screen such that the frames are the manner representing the appearance order of the points in the supply chain.

11. The processing apparatus according to claim 9, wherein the processor is further configured to execute the one or more instructions to generate the a second inventory status screen in which at least one of the graphical containers at least one of the points is replaced with a second graphical container illustrating a ratio between an optimal inventory quantity or an optimal inventory value among each of the points and a current inventory quantity or a current inventory value among each of the points.

12. A processing method executed by a computer, the method comprising:
   obtain, by communication over a network, inventory information and optimal inventory information at a plurality of points in a supply chain, the inventory information comprising any of current inventory quantities and current inventory values, and the optimal inventory information comprising any of an optimal inventory quantities and optimal inventory values;

identify ratios between the inventory information and the optimal inventory information, the ratios indicating at least quantity differences between ones of the current inventory quantities and the optimal inventory quantities and value differences between ones of the current inventory values and the optimal inventory values;

generate graphical containers based on the ratios such that sizes of contained objects in the one or more graphical containers are adjusted based on sizes of any of the quantity differences and value differences; and generating and outputting, on a user interface, an inventory status screen on which an inventory status at each of the points in the supply chain is displayed and also at least one of the contained objects of at least one of the graphical containers is displayed, on the inventory status screen, at a size, of the sizes adjusted based on at least one of the ratios, the size visually illustrating at least one of any of the quantity differences and the value differences, wherein on the inventory status screen, the graphical containers respectively correspond to ones of the plurality of points in a manner representing an appearance order of the points in the supply chain.

13. A non-transitory storage medium storing a program causing a computer to:

obtain, by communication over a network, inventory information and optimal inventory information at a plurality of points in a supply chain, the inventory information comprising any of current inventory quantities and current inventory values, and the optimal inventory information comprising any of an optimal inventory quantities and optimal inventory values;

identify ratios between the inventory information and the optimal inventory information, the ratios indicating at least quantity differences between ones of the current inventory quantities and the optimal inventory quantities and value differences between ones of the current inventory values and the optimal inventory values;

generate graphical containers based on the ratios such that sizes of contained objects in the one or more graphical containers are adjusted based on sizes of any of the quantity differences and value differences; and generate and output, on a user interface, an inventory status screen on which an inventory status at each the points in the supply chain is displayed and also at least one of the contained objects of at least one of the graphical containers is displayed, on the inventory status screen, at a size, of the sizes adjusted based on at least one of the ratios, the size visually illustrating at least one of any of the quantity differences and the value differences, wherein on the inventory status screen, the graphical containers respectively correspond to ones of the plurality of points in a manner representing an appearance order of the points in the supply chain.

* * * * *